(12) United States Patent
Sweeney et al.

(10) Patent No.: US 7,609,669 B2
(45) Date of Patent: Oct. 27, 2009

(54) VOICE DIRECTED SYSTEM AND METHOD CONFIGURED FOR ASSURED MESSAGING TO MULTIPLE RECIPIENTS

(75) Inventors: Lawrence R. Sweeney, Bethel Park, PA (US); James D. Maloy, Greensburg, PA (US); Claudine Astorri, Pittsburgh, PA (US); Linda Boyle, Wilmerding, PA (US)

(73) Assignee: Vocollect, Inc., Pittsburgh, PA (US)

( * ) Notice: Subject to any disclaimer, the term of this patent is extended or adjusted under 35 U.S.C. 154(b) by 751 days.

(21) Appl. No.: 11/057,537

(22) Filed: Feb. 14, 2005

(65) Prior Publication Data

US 2006/0182085 A1 Aug. 17, 2006

(51) Int. Cl.
*H04Q 7/00* (2006.01)
(52) U.S. Cl. ............... 370/328; 370/312; 455/418; 704/277
(58) Field of Classification Search ......... 455/310, 455/312, 328; 370/418; 704/277
See application file for complete search history.

(56) References Cited

U.S. PATENT DOCUMENTS

| | | | |
|---|---|---|---|
| 5,142,279 A | 8/1992 | Jasinski et al. | |
| 5,206,901 A | 4/1993 | Harlow et al. | |
| 5,224,150 A | 6/1993 | Neustein | |
| 5,297,143 A | 3/1994 | Fridrich et al. | |
| 5,315,642 A | 5/1994 | Fernandez | |
| 5,473,667 A | 12/1995 | Neustein | |
| 5,613,201 A | 3/1997 | Alford et al. | |
| 5,657,375 A | 8/1997 | Connolly et al. | |
| 5,757,281 A | 5/1998 | Schwendeman et al. | |
| 5,792,204 A * | 8/1998 | Snell ............... | 607/32 |
| 5,809,130 A | 9/1998 | Ayala | |
| 5,822,405 A * | 10/1998 | Astarabadi ............... | 379/88.04 |
| 5,870,454 A | 2/1999 | Dahlen | |
| 5,878,230 A | 3/1999 | Weber et al. | |
| 6,092,102 A | 7/2000 | Wagner | |
| 6,169,904 B1 | 1/2001 | Ayala et al. | |
| 6,246,871 B1 | 6/2001 | Ala-Laurila | |
| 6,366,882 B1 * | 4/2002 | Bijl et al. ............... | 704/235 |
| 6,463,462 B1 | 10/2002 | Smith et al. | |
| 6,653,930 B1 | 11/2003 | Bonomo et al. | |
| 6,668,173 B2 | 12/2003 | Greene | |
| 2002/0000470 A1 | 1/2002 | Lanzaro et al. | |
| 2002/0067806 A1 | 6/2002 | Rodriguez et al. | |
| 2002/0068583 A1 | 6/2002 | Murray | |
| 2002/0102967 A1 | 8/2002 | Chang et al. | |
| 2002/0146096 A1 | 10/2002 | Agarwal et al. | |

(Continued)

FOREIGN PATENT DOCUMENTS

EP 1 383 029 A2 1/2004

(Continued)

OTHER PUBLICATIONS

European Patent Office, International Search Report in related Application No. PCT/US2006/005117 dated Nov. 22, 2006.

*Primary Examiner*—Nhan T Le
(74) *Attorney, Agent, or Firm*—Wood, Herron & Evans, LLP

(57) ABSTRACT

A communications system transmits messages via a wireless network to multiple users nearly simultaneously in real-time. Each user has a terminal that receives a message and plays the message for the user. The terminal may also wait for the user to verbally acknowledge the arrival of the message before continuing with its normally executing application. The sender of the message may track, for each intended recipient, the delivery of the message, the accessing of the message by the user, and the acknowledgement by the user that the message was understood.

33 Claims, 2 Drawing Sheets

U.S. PATENT DOCUMENTS

| | | |
|---|---|---|
| 2002/0165000 A1 | 11/2002 | Fok |
| 2002/0177428 A1 | 11/2002 | Menard et al. |
| 2002/0194280 A1 | 12/2002 | Altavilla et al. |
| 2003/0046354 A1* | 3/2003 | Mizuno .................. 709/206 |
| 2003/0064716 A1 | 4/2003 | Gailey et al. |
| 2003/0097407 A1 | 5/2003 | Litwin et al. |
| 2003/0097485 A1 | 5/2003 | Horvitz et al. |
| 2003/0101150 A1 | 5/2003 | Agnihotri et al. |
| 2003/0101343 A1 | 5/2003 | Eaton et al. |
| 2003/0104805 A1 | 6/2003 | Weksel |
| 2003/0125062 A1 | 7/2003 | Bethards et al. |
| 2003/0129969 A1 | 7/2003 | Rucinski |
| 2003/0135569 A1 | 7/2003 | Khakoo et al. |
| 2003/0153343 A1 | 8/2003 | Crockett et al. |
| 2004/0030750 A1 | 2/2004 | Moore et al. |
| 2004/0138781 A1 | 7/2004 | Sacks et al. |
| 2004/0186728 A1* | 9/2004 | Kuboyama et al. .......... 704/276 |
| 2005/0021344 A1* | 1/2005 | Davis et al. ................. 704/277 |

FOREIGN PATENT DOCUMENTS

EP          1 453 329 A1     9/2004

* cited by examiner

US 7,609,669 B2

VOICE DIRECTED SYSTEM AND METHOD CONFIGURED FOR ASSURED MESSAGING TO MULTIPLE RECIPIENTS

TECHNICAL FIELD

In a general sense the present invention concerns a wireless voice-directed communication method and system having the capability of sending messages to selected recipients with confirmation that the message has been received and opened by the selected recipients. The messaging capability of the system gives the system attributes of a silent public address system wherein only system users whose terminals have selected addresses hear the message.

BACKGROUND ART

Speech recognition has simplified many tasks in the workplace by permitting hands-free communication with a computer as a convenient alternative to communication via conventional peripheral input/output devices. A worker may enter data by voice using a speech recognizer and commands or instructions may be communicated to the worker by a speech synthesizer. Speech recognition finds particular application in mobile computing devices in which interaction with the computer by conventional peripheral input/output devices is restricted.

For example, wireless wearable terminals can provide a worker performing work-related tasks with desirable computing and data-processing functions while offering the worker enhanced mobility within the workplace. One particular area in which workers rely heavily on such wireless wearable terminals is inventory management. Inventory-driven industries rely on computerized inventory management systems for performing various diverse tasks, such as food and retail product distribution, manufacturing, and quality control. An overall integrated management system involves a combination of a central computer system for tracking and management, and the people who use and interface with the computer system in the form of order fillers and other workers. The workers handle the manual aspects of the integrated management system under the command and control of information transmitted from the central computer system to the wireless wearable terminal.

As the workers complete their assigned tasks, a bi-directional communication stream of information is exchanged over a wireless network between wireless wearable terminals and the central computer system. Information received by each wireless wearable terminal from the central computer system is translated into voice instructions or text commands for the corresponding worker. Typically, the worker wears a headset coupled with the wearable device that has a microphone for voice data entry and an ear speaker for audio output feedback. Responses from the worker are input into the wireless wearable terminal by the headset microphone and communicated from the wireless wearable terminal to the central computer system. Through the headset microphone, workers may pose questions, report the progress in accomplishing their assigned tasks, and report working conditions, such as inventory shortages. Using such wireless wearable terminals, workers may perform assigned tasks virtually hands-free without equipment to juggle or paperwork to carry around. Because manual data entry is eliminated or, at the least, reduced, workers can perform their tasks faster, more accurately, and more productively.

An illustrative example of a set of worker tasks suitable for a wireless wearable terminal with voice capabilities may involve initially welcoming the worker to the computerized inventory management system and defining a particular task or order, for example, filling a load for a particular truck scheduled to depart from a warehouse. The worker may then answer with a particular area (e.g., freezer) that they will be working in for that order. The system then vocally directs the worker to particular aisles and bins to pick particular quantities of various items. The worker vocally confirms each location and the number of picked items. The system may then direct the worker to a loading dock or bay for a particular truck to receive the order. As may be appreciated, the specific communications exchanged between the wireless wearable terminal and the central computer system can be task-specific and highly variable.

In addition to the individual communication links to each user, the capability to forward the same, or a similar, message to a number of different recipients is also beneficial. However, sending a message to multiple users, instead of just an individual user, complicates ensuring that all intended users received the message. Accordingly, there is a need, unmet by current wireless communication systems to deliver near real-time messages to multiple recipients that is accomplished without distracting a user and provides confirmation that the message was received and understood by each of the intended recipients.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

DETAILED DESCRIPTION OF SPECIFIC EMBODIMENTS

Figure 1:
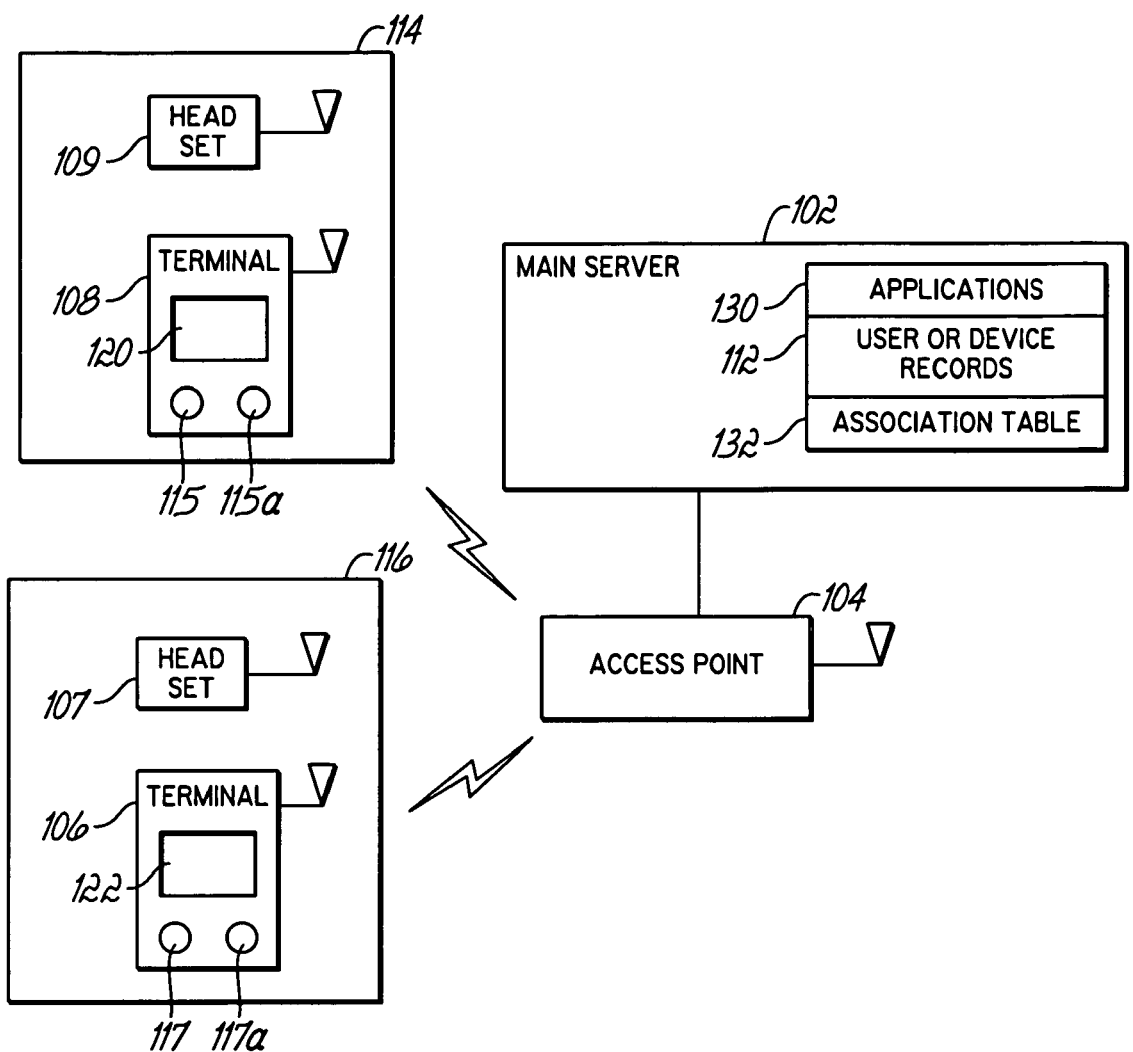
FIG. 1 illustrates an exemplary environment in which wireless devices operate in accordance with the principles of the present invention.

Embodiments of the present invention relate to a wireless communication system that includes a central computer communicating over a wireless network with a plurality of wireless terminals. The central computer can receive a message via input devices (e.g., a mouse, a keyboard, etc.) and then transmit the message to selected wireless terminals. At the wireless terminal, the message is converted to an audio signal that is output via a speaker. In response, a user can acknowledge receipt and understanding of the message by a vocal response that sends a second acknowledgment back to the central computer. Accordingly, the central computer is able to track delivery of the message to each of the intended recipients.

In a general sense in one aspect the present invention concerns a wireless voice-directed silent public address system having a server or central computer and a plurality of client terminals that typically are worn by or associated with individual users. The terminals have text-to-speech conversion capability. The system is configured such that the server sends a text message to a predetermined group of users operating an associated predetermined group of terminals that have selected terminal addresses. Only that group of terminals receive the text message and convert it to speech (such as through earpieces in a headset). Unlike a typical public address system wherein all persons in the environment are subjected to the message over loudspeakers, through this aspect of the invention the message is heard only by the associated predetermined group of users and is silent to all other persons in the environment.

An important aspect of the present invention is that the system has the capability of assuring that the users of the system (herein sometimes termed recipients of the message) actually receive and open the message. (As used herein, the term "open" can mean to initiate an audible presentation of the message as through earpieces, or can mean to initiate a visual presentation as on a terminal display.)

This assurance is provided by the server requiring two acknowledgements: 1) a first acknowledgement from the terminal that it has received the message, and 2) an acknowledgement from the terminal that the user has actually opened the message. The latter acknowledgement may be through a user speaking a special request or instruction that is parsed by voice recognition software located either in the server or the terminal.

A typical system use of the invention is in inventory management, quality control or the like running under a software application program. In accordance with an aspect of the invention, the application program may be interrupted when the server receives the acknowledgement that the message has been received by the terminal. The application is resumed when the server receives the second acknowledgement that the message has been received and opened by the terminal user. Other features and benefits of the invention will be described hereinafter.

FIG. 1 illustrates an exemplary environment utilizing wireless headsets in accordance with principles of the present invention. In use, a number of pairs of wireless headsets and terminals are used by different operators to communicate with a main server. The main server is able to send messages to a terminal, which relays it to its associated headset where audio output is generated. Speech input is generated at the headset, transmitted to the terminal and then relayed to the main server. The link between the terminals and the main server is typically a wireless network (e.g. 900 MHz, 2.4 GHz, Blue Tooth, etc.), which allows multiple terminals to share the spectrum. The link between the terminal and the headset is typically a cable or wire. In alternative embodiments, the headsets and terminals may be coupled together via a wireless connection.

The main server 102 is a conventional computer system that can run a variety of applications 130. These applications can relate to the business of maintaining inventory records for a warehouse and can include applications that relate to controlling the communications with the different terminals. These applications are usually integrated with one another to allow voice-controlled operation within the warehouse environment. The application that manages the wireless terminals maintains information about the identification of each terminal so that data can be directed to a desired terminal and information received at the server can be traced to the sending terminal. In a TCP/IP-based network, for example, the main server 102 would maintain a table of the IP address for each terminal and use these addresses to identify a sender or recipient of a particular message.

In the exemplary environment of FIG. 1, the main server 102 is coupled with one or more access points 104 which are distributed throughout an area serviced by a wireless network such as 802.11b, for example. One of ordinary skill will recognize that a number of other wireless network technologies are currently available for implementation as part of the present invention.

Each user within the environment of FIG. 1 includes a wireless terminal 106, 108 and an associated headset 107, 109. FIG. 1 shows a first paired set 114 and a second paired set 116. In accordance with one aspect of the invention, a terminal may include a visual display 120, 122 for displaying text messages and one or more indicator lights 115, 115a, 117, 117a, which may be illuminated based on messages received by the terminals 106,108. For example, lights 115, 117 may illuminate for some messages, while lights 115a, 117a might be illuminated for more urgent messages as discussed below. While only two users are shown in this figure, the present invention contemplates dozens of users being present in the same general location simultaneously. Exemplary headsets are marketed by the present Assignee as SR-20 Talkman® Lightweight Headset and exemplary terminals are marketed by the present Assignee Talkman® T2. Other headsets and terminals having similar capabilities are contemplated within the scope of the present invention as well.

To aid in monitoring the devices 114, 116, the main server 102 may maintain information 112 about which user is using what wireless device as well as address information 132 that associates a network address (e.g., an IP address) with a particular device, and, therefore with a particular user.

Figure 2:
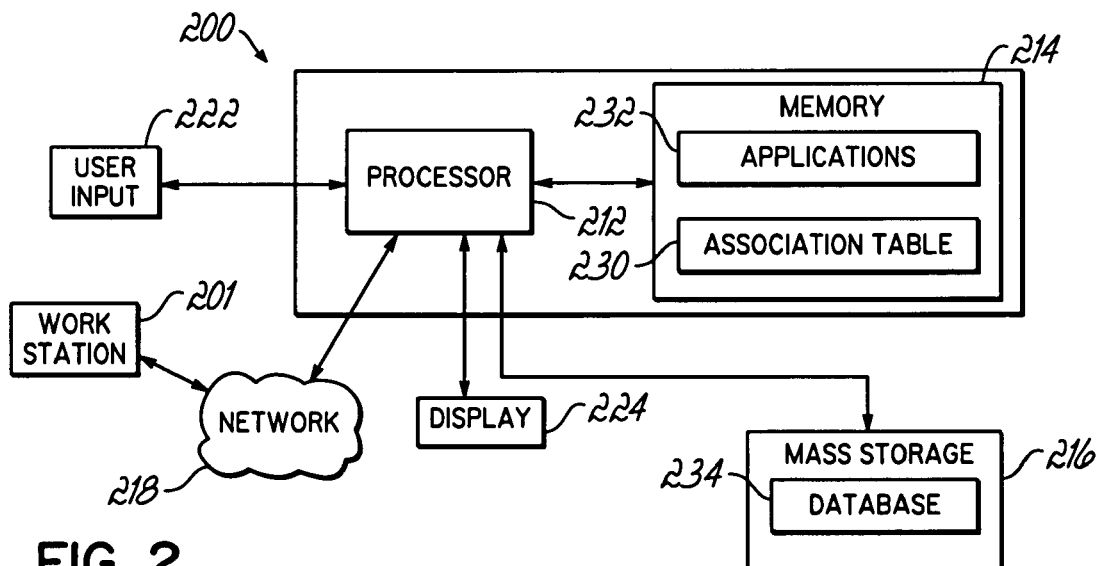
FIG. 2 depicts an exemplary computer platform that supports a system manager or server in accordance with the principles of the present invention.

FIG. 2 illustrates an exemplary hardware and software environment for the server or computer 200 suitable for implementing a main server that provides for sending messages to multiple terminals consistent with the invention. For the purposes of the invention, the computer 200 may represent practically any type of computer, computer system or other programmable electronic device, including a client computer, a server computer, a portable computer, a handheld computer, an embedded controller, etc. Moreover, the computer 200 may be implemented using one or more networked computers, e.g., in a cluster or other distributed computing system.

Computer 200 typically includes at least one processor 212 coupled to a memory 214. Processor 212 may represent one or more processors (e.g., microprocessors), and memory 214 may represent the random access memory (RAM) devices comprising the main storage of computer 200, as well as any supplemental levels of memory, e.g., cache memories, non-volatile or backup memories (e.g., programmable or flash memories), read-only memories, etc. In addition, memory 214 may be considered to include memory storage physically located elsewhere in computer 200, e.g., any cache memory in a processor 212, as well as any storage capacity used as a virtual memory, e.g., as stored on a mass storage device 216 or on another computer or device coupled to computer 200 via the Internet 218 or some other network (not shown).

Computer 200 also typically receives a number of inputs and outputs for communicating information externally. For interface with a user or operator, computer 200 typically includes one or more user input devices 222 (e.g., a keyboard, a mouse, a trackball, a joystick, a touchpad, and/or a microphone, among others) and a display 224 (e.g., a CRT monitor, an LCD display panel, and/or a speaker, among others). Otherwise, user input may be received via a workstation 201 used by remote personnel to access the computer 200 via the network 218, or via a dedicated workstation interface or the like.

For additional storage, computer 200 may also include one or more mass storage devices 216, e.g., a floppy or other removable disk drive, a hard disk drive, a direct access storage device (DASD), an optical drive (e.g., a CD drive, a DVD drive, etc.), and/or a tape drive, among others. Furthermore, computer 200 may include an interface with one or more networks 218 (e.g., a LAN, a WAN, a wireless network, and/or the Internet, among others) to permit the communication of information with other computers and devices coupled to the network. It should be appreciated that computer 200 typically includes suitable analog and/or digital interfaces between processor 212 and each of components 214, 216, 218, 222 and 224 as is well known in the art.

Computer 200 operates under the control of an operating system 230, and executes or otherwise relies upon various computer software applications 232, components, programs, objects, modules, data structures, etc. (e.g., database 234, among others). Moreover, various applications, components, programs, objects, modules, etc. may also execute on one or more processors in another computer coupled to computer 200 via another network, e.g., in a distributed or client-server computing environment, whereby the processing required to implement the functions of a computer program may be allocated to multiple computers over the network.

Other hardware components may be incorporated into system 200, as may other software applications. In general, the routines executed to implement the embodiments of the invention, whether implemented as part of an operating system or a specific application, component, program, object, module or sequence of instructions, or even a subset thereof, will be referred to herein as "computer program code", or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein. Those skilled in the art will recognize that the exemplary environment illustrated in FIG. 2 is not intended to limit the present invention. Indeed, those skilled in the art will recognize that other alternative hardware and/or software environments may be used without departing from the scope of the invention.

Figure 3:
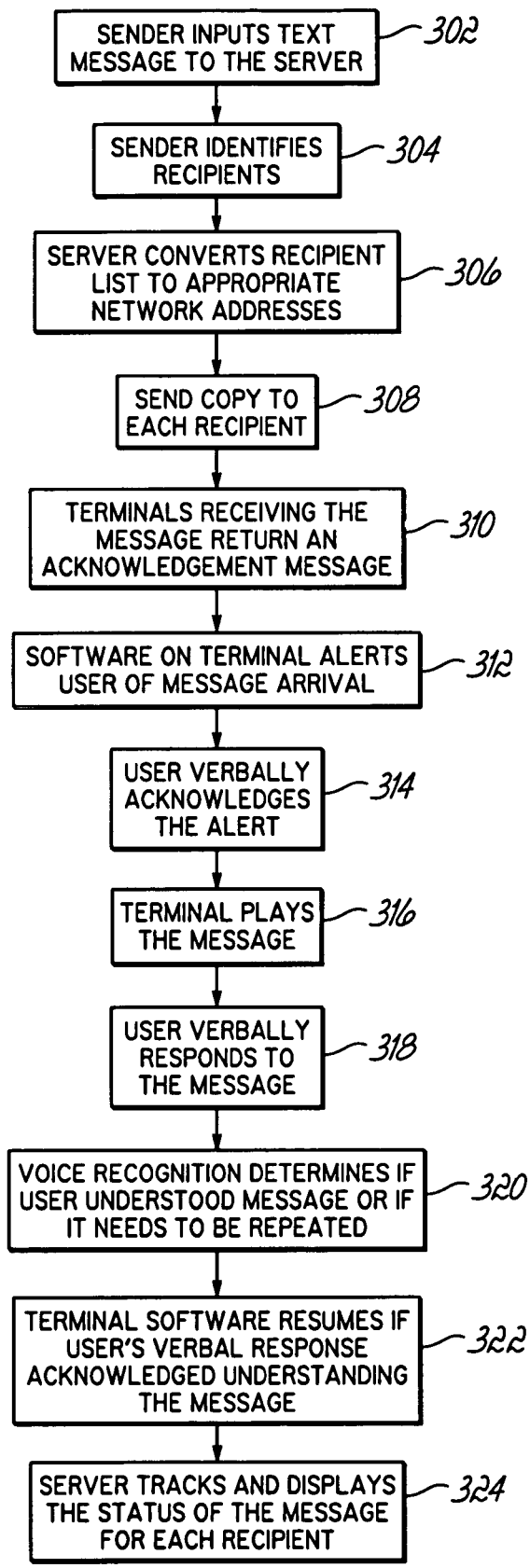
FIG. 3 depicts a flowchart of an exemplary method of sending and tracking messages to multiple wireless recipients in accordance with the principles of the present invention.

One particular software application that resides on the server is a messaging application that allows a user to enter a message, such as via a keyboard, select one or more recipients to receive the message, send the message to the recipients, and track responses from the recipients. The flowchart of FIG. 3 depicts an exemplary method that can be implemented in such a software application.

In step 302, a sender can input the message body to the software application. One exemplary method of data entry involves typing in a text message via a keyboard or similar device. Alternatively, the message could be spoken and converted from speech to text or to some other electronic format, such as digitized speech, in preparation for delivery. Additionally, a number of pre-defined message templates may exist from which a sender could select one to send to a group of users.

In step 304, the sender identifies which users are to receive the message, or alternatively, identifies which users to exclude from receiving the message. Similar to composing e-mail messages in conventional e-mail programs, identifying the recipients and building the body of the message can take place in either order, or even concurrently. While a sender could type in the name of each recipient, the present invention advantageously contemplates using address groups or address books to simplify identifying the group of one or more recipients of the message. The address book can be organized by supervisor, by functional work units, by alphabet, and by a variety of other schema as would be recognized by one of ordinary skill.

In step 306, the software application converts the selected recipient names to appropriate network addresses. As previously mentioned, the server typically maintains a table of network addresses for each terminal it can communicate with. For example, as part of activating a wireless terminal, the server and terminal may exchange initial messages to establish a viable communications link. This exchanged information from each terminal can be maintained in a table or other format by the server. In addition, the server will maintain a mapping between a terminal's address and a user's name. This mapping may be static if the same terminal is always assigned to the same user. Alternatively, the mapping can be dynamically created when a user is given a terminal at the beginning of a work period or if a user must replace a faulty terminal during a work period. Using this mapping information, the server can identify which network devices correspond to the list of recipients selected by the sender.

Thus, in step 308, the server sends a copy of the message to each of the selected recipients as soon as the sender completes selecting the recipients and composing the message. In a TCP/IP network, for example, a delivery protocol can be used such that, in step 310, the terminal sends back an acknowledge message to inform the server that the terminal correctly received the message. If no acknowledgement message is received by the server in a predetermined timeframe, then the server may attempt to re-send the message a number of times. If a terminal is turned off or is out-of-range, then delivery might not be possible. If, after a certain number of re-tries, an acknowledgement message is not received, then the message may be stored in a queue for later delivery. In such an instance, when that terminal once again establishes communication with the server over the wireless network, the server can send any undelivered messages in the queue. As is known in the art, each message may be assigned an "active" time window such that if the message is unable to be delivered during that time period, then it is deleted from the queue. Thus, a message about a meeting at 9:30 AM can be deleted from the queue instead of delivering it after the meeting is over.

Delivery of the message to the terminal, however, does not ensure that a user listened to and understood the message. Accordingly, the application running on the wireless terminal is configured to track how a user responds to the message. In particular, the software application executing on the terminal usually involves following a workflow sequence or application in conjunction with the activity of the user. For example, the user may be guided to a particular location in a warehouse, guided to a particular bin, and instructed to pick a particular quantity of a particular item. The user may provide confirmation information and check-digits throughout this process to ensure the right items were picked and to allow inventory records to be updated.

In response to receiving a message from the server, the software application interrupts the workflow process, in step 312, with an audible alarm or visual indicator such as an audible beep, an audible alert message, a flashing light or indicator, a vibrational mechanism, or a combination thereof. The terminals are configured to provide such visible indicator, audible alarms (e.g. through the headset) or vibrational alerts. For example, indicator lights 115, 117 might be used, or displays 120, 122 might also be used for sending an alert. Or, terminals 114, 116 might vibrate. The user may be performing some workflow activity, like backing-up a forklift, or filling a rush order, that should not be interrupted. In response to the alarm, and completing any imminent task, the user can reply such as to verbally acknowledge the receipt of the message, in step 314, by speaking an appropriate command or speech message such as, for example, "OK" or "Proceed". In addition to indicating readiness to receive the message by saying "OK" or "Proceed", the user may provide other responses as well. For example, the user may respond with "Reject", or a similar command, in order to ignore the messages or to request the server not to send the messages and continue with the task at hand.

In one particular example, a "delay" command can be used to delay the message for a brief period of time. The user may respond with "wait for 10". In response, the terminal captures and recognizes the command and waits 10 minutes before re-alerting the user of the message. If a default delay period is defined, then a user may simply respond with "wait". In addition to this particular example, the present invention contemplates a variety of user commands and voice recognition of those commands. For example, a message can be redirected to another party or terminal, stored in memory, or otherwise manipulated by an appropriate command.

Speech recognition capability can be included within the terminal sufficient to recognize the user's commands or the speech data can be electronically captured and forwarded by the terminal to the server for processing. The result, in the latter example, would be that the server, not the terminal, determines what was spoken by the user and issues instructions to the terminal accordingly.

In step 316, the software application responds to the user's "OK" command by opening and/or playing the message. The message might be opened and played by imitating an audible reproduction of the message as audio output. Alternatively, the message might be presented on the respective display 120, 122. In this way, a text message can be delivered as audio or text to one or more users in nearly real-time. In response to some other command, the software application will operate in an appropriate manner. In certain embodiments of the present invention, the software application of the terminal may send a second acknowledgement message to the server indicating how the message was handled by the user. The second acknowledgement message may indicate the message was accessed, rejected, delayed, or handled in some other way.

In another case, the additional acknowledgements may acknowledge that the user understood the received message. In response to listening to the audio-formatted message, the user may speak additional commands related to the message, in step 318. For example, the user may say "understood" or "received", or the user may ask for the message to be repeated. In response to receiving an unrecognized command, the terminal software may simply replay the message or produce an output indicating that the last command was not understood. Alternatively, an unrecognized command may simply be ignored, with no response until a recognizable command is spoken.

If speech recognition is performed by the terminal, then the server can receive a message or acknowledgement from the terminal that the user verbally acknowledged understanding the message. If speech recognition is performed at the server, then the server analyzes the speech data received from the terminal to determine if that speech acknowledges understanding of the message by the user. Once it is determined, in step 320 that the user has verbally acknowledged understanding the message, then the terminal software may proceed, in step 322, with the workflow process or application that the message interrupted. Until such acknowledgement is received, the terminal software may remain interrupted and wait for the user to acknowledge the message. Alternatively, if the user has purposely ignored or delayed the message, then the terminal software may proceed with the current workflow process.

The present invention may be utilized to improve time efficiency for workers, and to also provide an overall management and supervision for workers, such as order pickers, apart from the specific tasks associated with their current workflow process. Furthermore, the invention provides the ability to handle emergencies, such as one or more impending dangerous situations, which might be encountered by a worker, and also to alert various workers to medical emergencies of their other co-workers, for example.

With the invention, workers can receive priority action reminders, informational messages and emergency messages that are important or even critical. In one example, one or more pickers, in addition to picking items to fill a particular order, may also be needed to unload shipped items from a truck for shipment delivered to the warehouse. For such a task, they may need to be at the dock at a certain time for unloading. Since a number of pickers often do not wear a watch because it might be caught on something in the warehouse, they may not be particularly good at keeping track of time. Or, they simply might need to be reminded in their hectic day of filling orders. In accordance with the invention, a reminder message might be issued to a group of workers, which are to be used for unloading and delivery. To that end, a message would be sent and an indicator light 115, 117 illuminated to provide an alert for the reminder. As noted above, other alerts, such as audible beeps, vibrations or text messages on a display 120, 122 might also be utilized. Then, a worker may acknowledge receipt of the message so that an audible reproduction of the message can occur to remind the worker to be at a certain dock at a certain time for unloading. This enhances the efficiency of not only order filling but also overall inventory management.

Similarly, the present invention might be utilized to provide an informational message or reminder to all pickers that inventory process for the warehouse, or a section of the warehouse is going to occur on that day, and that orders are therefore not to be picked that day. Initially, such information may have been given to the pickers in a meeting, but the present invention might be utilized additionally as a reminder. Similarly, a reminder that a group meeting for the pickers is to be held might also be sent to selected workers in a group to reduce and eliminate inefficiencies caused by workers who have forgotten the meeting or are somewhere else in the warehouse. The acknowledgement schemes and the audit trail provided by the present invention allow supervisors to confirm that certain workers have received the message, and should therefore be in attendance at the meeting. This eliminates a necessity to hunt for an employee who is not at the meeting.

In another aspect of the present invention, informational messages are provided which enhance the actual workflow process. For such messages, it may be desirable to actually interrupt the workflow process. For example, the picker may find that an item to be picked is not currently at a particular bin or slot or on a shelf. At the time the order is being picked, the item will be "out" and therefore the picker will indicate to the system that the item is "out of stock." However, that item might actually be available in the warehouse, such as in a recent delivery, and thus may be restocked before days end. Accordingly, the picker might be alerted, such as through an indicator light 115, 117 or other audio or visual indicator that certain items to be picked are not in stock in the morning but will be later on in the afternoon. As such, the picking of orders calling for such items should wait until later in the day. This enhances efficiency in the picking process, and eliminates delay associated with informing a customer that an item is out of stock and having to repick part of the order later.

In accordance with another aspect of the invention in addition to the informational messages and priority action reminders noted above, such as those regarding a meeting or specific tasks, for example, the present invention also provides first responder messages to workers and terminal users to handle emergency tasks. For example, a message might be provided to the terminal wherein the message is associated with a weather emergency, workplace emergency, medical emergency, or other emergency, which requires immediate response. The terminals 114, 116 may utilize separate audible or visual indication, such as separate indicator lights 115a, 117a, that are reserved only for such higher priority messages or "first responder" messages. Therefore, the present invention may use varying types of messages and will differentiate between them and provide different alerts or alarms. Usually, medical, weather or other emergencies will take precedence over other meeting reminders and the like.

In one example, a weather emergency, such as a storm or tornado warning, might be sent to the terminals in the form of a message. Warehouses can be windowless and are often very noisy, and thus the traditional public address system might not sufficiently handle the situation. In such a weather emergency, the present invention may be utilized as a "silent" PA system to first alert a user, receive acknowledgement, and then play the message so that the user knows what to do in the case of such an emergency. Each terminal user will hear their own message. For example, the user might be ordered to report to a particular area in the warehouse. Similarly, for a workplace emergency, such as a collapse of a structure, a spilled substance, or other event, the present invention may be utilized to inform the users so that they can avoid the area. As noted, separate indicator lights 115a, 117a or other separate alert might be utilized to indicate that the emergency is one of high priority. Of course, an audio alert provided at the terminal might also indicate that an emergency has occurred and that an emergency message must be accessed immediately and responded to.

The present invention can be particularly useful in a situation of a first responder alert, wherein a medical emergency, such as involving another co-worker, requires the assistance of one of the workers in a warehouse. For example, the message may indicate that an employee in aisle 6, bin 10 is having a medical emergency and may need assistance. The terminal user, upon being presented with the first responder alert, would then immediately listen to the message and respond accordingly to the person in need of medical or other help.

Such examples as noted above are only some of the examples wherein the present invention might be efficiently utilized. Therefore, such examples are not meant to be limiting in any way with respect to the invention.

The present invention provides auditing and tracking advantages as well. In step 324, the server tracks the status of the message delivery to each of the recipients. Based on the exchange of messages and acknowledgements, the server can include a graphical user interface that displays the message status. For example, the user interface may include a drop-down menu that permits a sender to select a previously sent message. In response to a message being selected, the server retrieves the appropriate address list and for each recipient can display whether the respective terminal received the message, whether the message was outputted for the user, and whether the user acknowledged understanding the message. This information can also include time stamps of the different events as well as link to the actual voice data captured from a user regarding the message and stored in computer-accessible memory.

In this manner, an audit trail is created that shows when and if a user received the message. Furthermore, the audit trail permits tracking of whether the user understood and acknowledged understanding the message. By viewing the user interface, the sender can quickly identify users that may need to be located because they did not receive the message, or determine if alternate means of message delivery should be used, or decide if further clarification of the original message is needed.

Thus a communications system has been described that transmits messages via a wireless network to multiple users nearly simultaneously in real-time. Each user has a terminal, which receives a message and plays the message for the user. The terminal may also wait for the user to verbally acknowledge the arrival of the message before continuing with its normally executing application. The sender of the message may track, for each intended recipient, the delivery of the message, the accessing of the message by the user, and the acknowledgement by the user that the message was understood.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A method for sending a message to a set of selected operators performing logistical operations at a warehouse, the method comprising the steps of:
   executing a logistical application on at least one wireless terminal that is communicating with a server over a wireless network within the warehouse;
   receiving at the at least one wireless terminal a textual message transmitted from the server;
   outputting the received textual message as audio output with a speaker that is in communication with the at least one wireless terminal;
   receiving a verbal indication from an operator of the wireless terminal that the textual message audio output was at least one of accessed or understood by the operator; and
   transmitting an acknowledgement message to the server from the terminal that the verbal indication was received from the operator.

2. The method of claim 1, further comprising the steps of:
   announcing to the operator that the textual message was received from the server; and
   delaying outputting of the received textual message as audio input until receiving a verbal instruction from the operator.

3. The method of claim 2, further comprising the steps of:
   interrupting the logistical application after receiving the verbal instruction; and
   resuming the logistical application after receiving the verbal indication.

4. The method of claim 1, further comprising the step of:
   performing speech recognition on the verbal indication to determine whether the operator at least one of accessed or understood the audio output.

5. The method of claim 1, wherein the acknowledgement message includes a timestamp.

6. The method of claim 1, further comprising the step of:
   automatically transmitting an acknowledgement message when the textual message is successfully received at the at least one wireless terminal.

7. The method of claim 1 wherein the message is associated with one of an event reminder, or an emergency message for the terminal operator.

8. The method of claim 1 further comprising:
   receiving, at a server, a textual message to be forwarded to the at least one wireless terminal;
   transmitting the textual message to the at least one wireless terminal;
   transmitting from the at least one wireless terminal, to the server, an acknowledgement message that the textual message was received at the at least one wireless terminal.

9. The method of claim 8 further wherein the transmitted textual message includes a time window defining a time for the message received at the at least one wireless terminal.

10. The method of claim 8 further comprising maintaining a record at the server regarding the acknowledgement messages that the textual message was received at particular wireless terminals.

11. The method of claim 10 further comprising tracking from the record which terminals received the textual message.

12. The method of claim 1 further comprising maintaining a record at the server regarding the acknowledgement messages from a particular operator.

13. The method of claim 12 further comprising tracking from the record which operators at least one of accessed or understood the textual message.

14. The method of claim 1 wherein the set of selected operators includes one operator.

15. The method of claim 1 wherein the set of selected operators includes more than one operator.

16. The method of claim 1 further comprising:
   upon receiving the textual message, generating an alarm to alert the operator of its receipt.

17. The method of claim 16 further comprising:
   receiving, at the terminal, a verbal command from the operator regarding how to handle the received textual message; and
   handling the textual message according to the verbal command.

18. The method of claim 17 further comprising:
   wherein the handling of the textual message includes at least one of: playing the message, discarding the message, ignoring the message, delay playing of the message, and re-directing the message.

19. A method for delivering a message in a speech-enabled work environment that includes a plurality of users with terminal devices that perform applications using speech, the method comprising the steps of:
   executing at least one application, using user speech and speech recognition, through a terminal device that is communicating with a communications network;
   receiving the message, at the terminal device of a user, over the communications network;
   outputting the message as audio output to the user of the terminal device;
   receiving verbal confirmation spoken by the user that the audio output was at least one of accessed or understood; and
   transmitting an acknowledgement message from the terminal device over the communications network, the acknowledgement message being reflective of the receipt of the spoken verbal confirmation for indicating that the audio output was at least one of accessed or understood by the user.

20. The method of claim 19, wherein the message is delivered to a plurality of different users.

21. The method of claim 19, wherein the communications network is a wireless network.

22. The method of claim 19, wherein the step of outputting the message further includes the steps of:
   indicating that the message has been received;
   delaying outputting of the message as audio output until receiving a verbal command; and
   receiving the verbal command to play the message.

23. The method of claim 19, further comprising the step of:
   in response to receiving the message, sending an acknowledgement message over the network indicating that the message was successfully received at the terminal device.

24. The method of claim 19, further comprising the step of:
   converting the message from text format to audio output.

25. The method of claim 19, further comprising the steps of:
   receiving a verbal instruction from the user to replay the message; and
   in response, replaying the message as audio output.

26. A method for delivering a message in a speech-enabled work environment that includes a plurality of users with terminal devices that perform applications using speech, the method comprising the steps of:
   executing at least one application, using user speech, through a terminal device that is communicating with a communications network;

receiving the message, at the terminal device of a user, over the communications network;

outputting the message as audio output to the user, by indicating that the message has been received, delaying outputting of the message as audio output until receiving a verbal command and receiving the verbal command to play the message;

interrupting an executing application when the verbal command is received; and receiving verbal confirmation from the user that the audio output was at least one of accessed or understood;

resuming the executing application when the verbal confirmation is received;

transmitting an acknowledgement message from the terminal device over the communications network, the acknowledgement message indicating that the audio output was at least one of accessed or understood by the user.

27. A multi-recipient communications system for facilitating speech-enabled work among a plurality of users comprising:

a server configured to transmit a message to multiple users;

a plurality of terminal devices associated with the users and configured for use with speech recognition applications, each terminal device configured to receive the message;

a wireless network configured to provide bi-directional communication between the server and the plurality of user terminal devices for the user to execute at least one application; and each of the terminal devices further configured to output the message as audio output to the respective user, receive a respective verbal confirmation spoken by the user that the audio output was at least one of accessed or understood, and transmit, to the server, a respective indication that reflects that the spoken verbal confirmation was received from the user.

28. The system of claim 27, wherein the server is further configured to:

receive the message as input;

receive an identification of each of the multiple users;

identify a respective terminal device associated with each of the multiple users, and address a respective copy of the message for delivery to each of the respective terminal devices.

29. The system of claim 27, wherein each of the terminal devices is further configured to:

convert the message to audio output from text format; and play the message as audio output.

30. The system of claim 27, wherein each of the terminal devices is further configured to transmit a respective acknowledgement message indicating that the message was successfully received by the terminal device.

31. The system of claim 30, wherein the server is further configured to:

determine for each of the terminal devices whether a respective indication of verbal confirmation has been received;

determine for each of the terminal devices whether a respective acknowledgement message has been received; and display a respective message status for each of the terminal devices indicating whether the message was at least one of received or understood.

32. A multi-recipient communications system for facilitating speech-enabled work among a plurality of users comprising:

a server configured to transmit a message to multiple users;

a plurality of terminal devices associated with the users, each terminal device configured to receive the message;

a wireless network configured to provide bi-directional communication between the server and the plurality of user terminal devices for the user to execute at least one application; and each of the terminal devices further configured to:
output the message as audio output to the respective user;

receive a respective verbal confirmation from the user regarding whether the audio output was at least one of accessed or understood;

perform speech recognition on the verbal confirmation from the user to determine if the verbal confirmation indicates the audio output was at least one of accessed or understood;

re-output the message as audio output to the respective user if the verbal confirmation does not indicate that the message was understood;

transmit, to the server, a respective indication that the verbal confirmation was received from the user.

33. A multi-recipient communications system for facilitating speech-enabled work among a plurality of users comprising:

a server configured to transmit a message to multiple users;

a plurality of terminal devices associated with the users, each terminal device configured to receive the message and to transmit a respective acknowledgement message indicating that the message was successfully received by the terminal device;

a wireless network configured to provide bi-directional communication between the server and the plurality of user terminal devices for the user to execute at least one application, including executing a logistical application within a warehouse environment;

each of the terminal devices further configured to output the message as audio output to the respective user, receive a respective verbal confirmation from the user that the audio output was at least one of accessed or understood, and transmit, to the server, a respective indication that the verbal confirmation was received from the user; the terminal devices further configured to interrupt the logistical application after outputting the audio output; and resume the logistical application after receiving the verbal confirmation.

* * * * *